(12) United States Patent
Martin et al.

(10) Patent No.: US 6,474,151 B1
(45) Date of Patent: Nov. 5, 2002

(54) INSTRUMENT FOR SOIL SURFACE ANALYSIS AND USE FOR ANALYZING THE WALL OF A WELL IN PARTICULAR AN OIL WELL

(75) Inventors: Jean-Pierre Martin, 19 Route de Paris, 27100 Le Vaudreuil (FR); Robert Dovis, Malemort (FR); Jean-Michel Fedele, Marignane (FR)

(73) Assignee: Jean-Pierre Martin, Paris (FR)

( * ) Notice: Subject to any disclaimer, the term of this patent is extended or adjusted under 35 U.S.C. 154(b) by 0 days.

(21) Appl. No.: 10/009,464

(22) PCT Filed: Jun. 13, 2000

(86) PCT No.: PCT/FR00/01622

§ 371 (c)(1),
(2), (4) Date: Dec. 14, 2001

(87) PCT Pub. No.: WO01/01171

PCT Pub. Date: Jan. 4, 2001

(30) Foreign Application Priority Data

Jun. 25, 1999 (FR) .............................. 99 08896

(51) Int. Cl.⁷ .................. E21B 47/00; E21B 23/00; G01V 1/00
(52) U.S. Cl. ............... 73/152.16; 367/35; 166/381
(58) Field of Search ............. 73/152.16, 152.02, 73/152.05, 152.17; 367/25, 30, 32, 35; 166/254.2, 381, 382; 175/24, 51, 99

(56) References Cited

U.S. PATENT DOCUMENTS

| 4,130,816 A | 12/1978 | Vogel et al. |
| 4,686,653 A | 8/1987 | Staron et al. |
| 5,448,912 A | 9/1995 | Black |
| 5,995,447 A | * 11/1999 | Mandal et al. ............... 367/35 |

* cited by examiner

Primary Examiner—Daniel S. Larkin
Assistant Examiner—Jay L. Politzer
(74) Attorney, Agent, or Firm—Sughrue Mion, PLLC

(57) ABSTRACT

The present invention relates to analysis tools for analyzing the ground 1, from a surface 2 thereof, by means of a sonde 3 having a given analysis lobe 4 and a resolution time T. The tool of the invention is essentially characterized by the fact that it comprises a drive head 10 driven to move in continuous translation at a speed V relative to the surface 2 and along a direction 11 parallel to the surface 2, a skid 12, means 13 for associating the sonde 3 and the skid 12 so that the sonde can analyze the rocks contained in its lobe 4, and means 14 for coupling together the drive head 10 and the skid 12 so that the two elements can be displaced relative to each other along the direction 11 over a distance D. The tool of the invention finds a particularly advantageous application in analyzing oil-bearing rocks surrounding the wall 30 of an oil well 31, in order to determine both the distribution of the porosity of the rocks, and their associated permeability.

9 Claims, 3 Drawing Sheets

INSTRUMENT FOR SOIL SURFACE ANALYSIS AND USE FOR ANALYZING THE WALL OF A WELL IN PARTICULAR AN OIL WELL

The present invention relates to analysis tools for analyzing the ground, from a surface thereof, by means of a sonde, enabling the rocks contained in the ground to be analyzed, and more particularly it relates to analysis tools for analyzing rocks which surround a well, e.g. tools for determining both the distribution of the porosity of oil-bearing rocks, and their associated permeability.

Analysis sondes for analyzing both the distribution of the porosity of oil-bearing rocks, and their associated permeability, are already known. In general, such sondes have a resolution time of approximately one to three seconds. They are disposed facing the rocks to be analyzed and must, in theory, be maintained facing said rocks during a period of time that is not less than their resolution time. Concerning the height of the volume in which rocks are analyzed, which volume is referred to below as the "lobe", said height can vary greatly depending on the structure of the sonde, e.g. from a few centimeters to more than a meter. Consequently, in order to be able to analyze rocks covering a significant height, it is necessary to displace the sonde along the wall of the well and carry out a large number of successive measurements.

Such is the case, for example, of the device described in U.S. Pat. No. 4,686,653 which, in an attempt to mitigate the above-mentioned drawbacks, uses two sondes, thereby considerably increasing the cost of the device, whilst nevertheless failing to give reliable comparable results because it uses two sondes, and consequently two different sensors which experience shows will never have responses that are identical and which can, in addition, be positioned differently down the well relative to the wall of the well, thereby emphasizing that it is almost impossible to check their positions relative to the wall. Furthermore, the device operates in a single sense only, i.e. when going down a well, which is almost impossible to do in a deep oil well or the like, for example.

In addition, in particular in the case of oil wells which are always very deep, the length of the cables necessary for moving the tools carrying the sondes does not enable the tools to be displaced step by step. With a sonde have a tall lobe, it is possible for the sonde to be driven to move in continuous translation at a determined speed without being held stationary during the resolution time, and the results that are obtained are then corrected by computation. It will therefore be understood that measurement accuracy depends on lobe height. Attempts have therefore been made in the art to provide analysis sondes having lobes of height that is as small as possible.

However, in particular in the oil industry, ground analysis must imperatively be performed in the shortest possible time. Sondes must be driven to move in continuous translation at a speed which is generally imposed by other considerations and which is generally too fast relative to sonde resolution time and lobe height for the corrections computed on the measurements to be able to lead to results that are reliable.

Thus, an object of the present invention is to provide an analysis tool for analyzing the ground by means of a sonde enabling the rocks contained in the ground to be analyzed, using sondes having given resolution times and lobes of relatively small height, and enabling the sondes to be driven at a relatively high average speed, while giving analysis results that are reliable and perfectly acceptable.

More precisely, the present invention provides an analysis tool for analyzing the ground, from a surface thereof, by means of a sonde having a determined analysis lobe and a resolution time equal to T, the tool being characterized by the fact that it comprises:

a drive head driven to move in continuous translation at a speed V relative to said surface of the ground and along a given direction parallel to said surface;

a skid;

means for associating the sonde and the skid so that the sonde can analyze the rocks contained in said lobe; and means for coupling together the drive head and the skid so that the two elements can be displaced relative to each other along said direction over a distance having a value equal to D.

Other characteristics and advantages of the invention will appear on reading the following description given by way of non-limiting illustrative examples and with reference to the accompanying drawings, in which:

FIG. 2 is a diagram of a particular embodiment of the tool, shown by the outline diagram in FIG. 1, in an application to analyzing the ground surrounding the wall of an oil well or the like.

Figure 1:
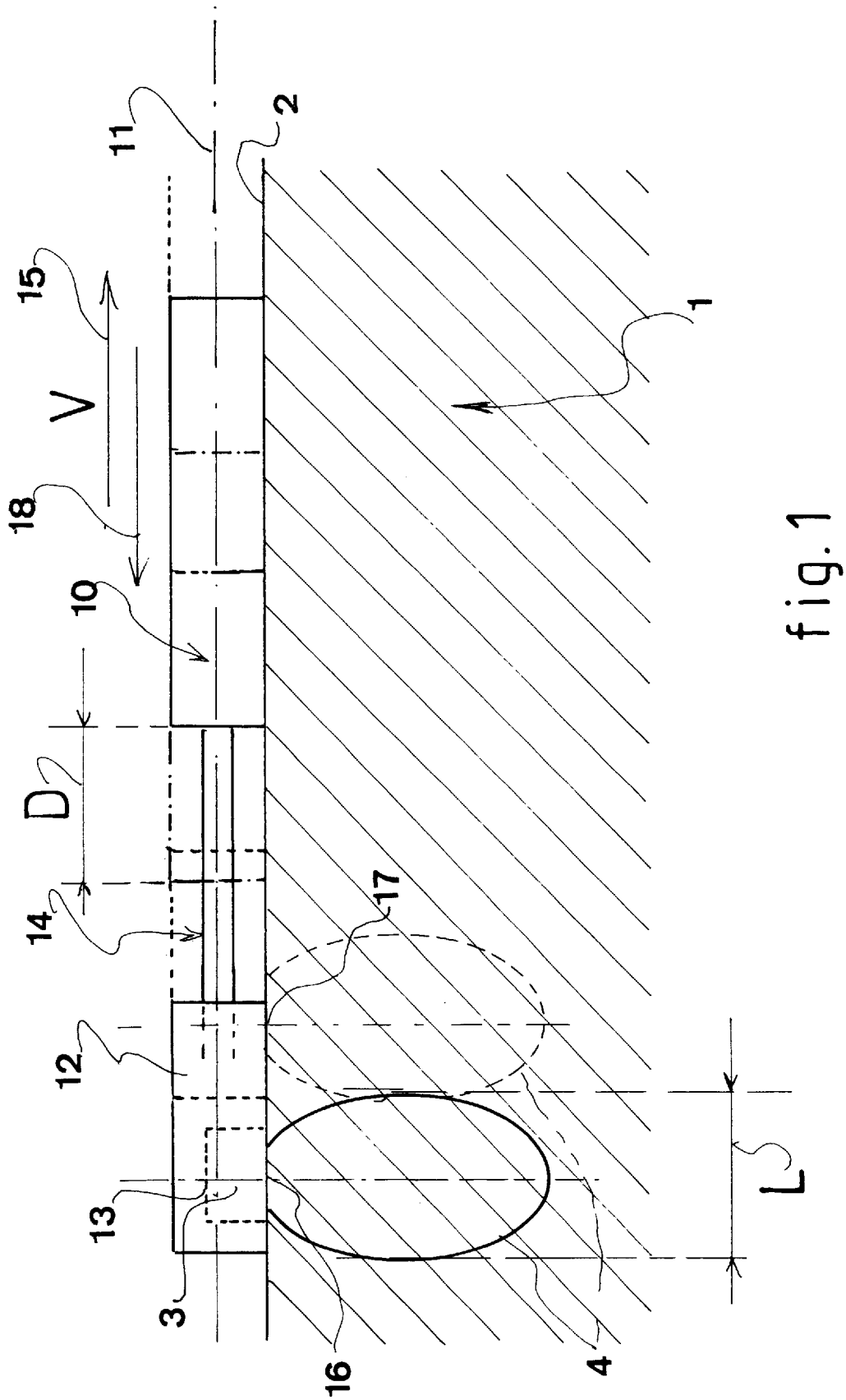
FIG. 1 is an outline diagram of a ground analysis tool of the invention.

FIG. 1 is an outline diagram of an analysis tool for analyzing the ground 1, from a surface 2 thereof, by means of a sonde 3 having a determined analysis lobe 4 and a resolution time equal to T. Such sondes are well known in themselves, e.g. those measuring both the distribution of the porosity of a rocky medium or the like, and/or its associated permeability. The analysis lobes 4 present various shapes, e.g. substantially in the form of toruses, portions of toruses, ellipsoids, etc. The resolution time T is the time required by the sonde to carry out a measurement on the rocks contained in its analysis lobe. Naturally, the resolution time depends on the type of sonde. In the case of the sondes given above by way of example, the resolution time T is about one second.

In FIG. 1, the tool of the invention enabling such analysis to be performed includes a drive head 10 driven to move in translation at a speed V relative to the surface 2 of the ground 1, along a given direction 11 parallel to said surface 2.

The tool further includes a skid 12, means 13 for associating the sonde 3 and the skid so that when the skid is facing the ground to be analyzed, the sonde can carry out measurements on the rocks contained in its lobe 4, and means 14 for coupling together the drive head 10 and the skid 12 so that these two elements can be displaced relative to each other along the given direction 11 over a distance having a value equal to D.

The drive head 10 can be of any type, e.g. a motor-driven carriage or the like suitable for being displaced over the surface 2 of the ground 1. A particular embodiment of the drive head is given below with reference to FIG. 2 in a particularly advantageous application of a tool for analyzing oil-bearing rocks surrounding the wall of a well.

The means 13 can, themselves, also be of any type. They are generally constituted by fixing means for fixing the sonde in a lateral housing formed in the wall of the skid 12.

According to a characteristic of the invention, the value D is a function of the width L of the lobe defined along the given direction 11, of the speed V, and of the resolution time T. The above-defined values D, L, V, and T are advantageously linked by the following relationships $D \geq L$ and $D \geq VT$.

Figure 2:
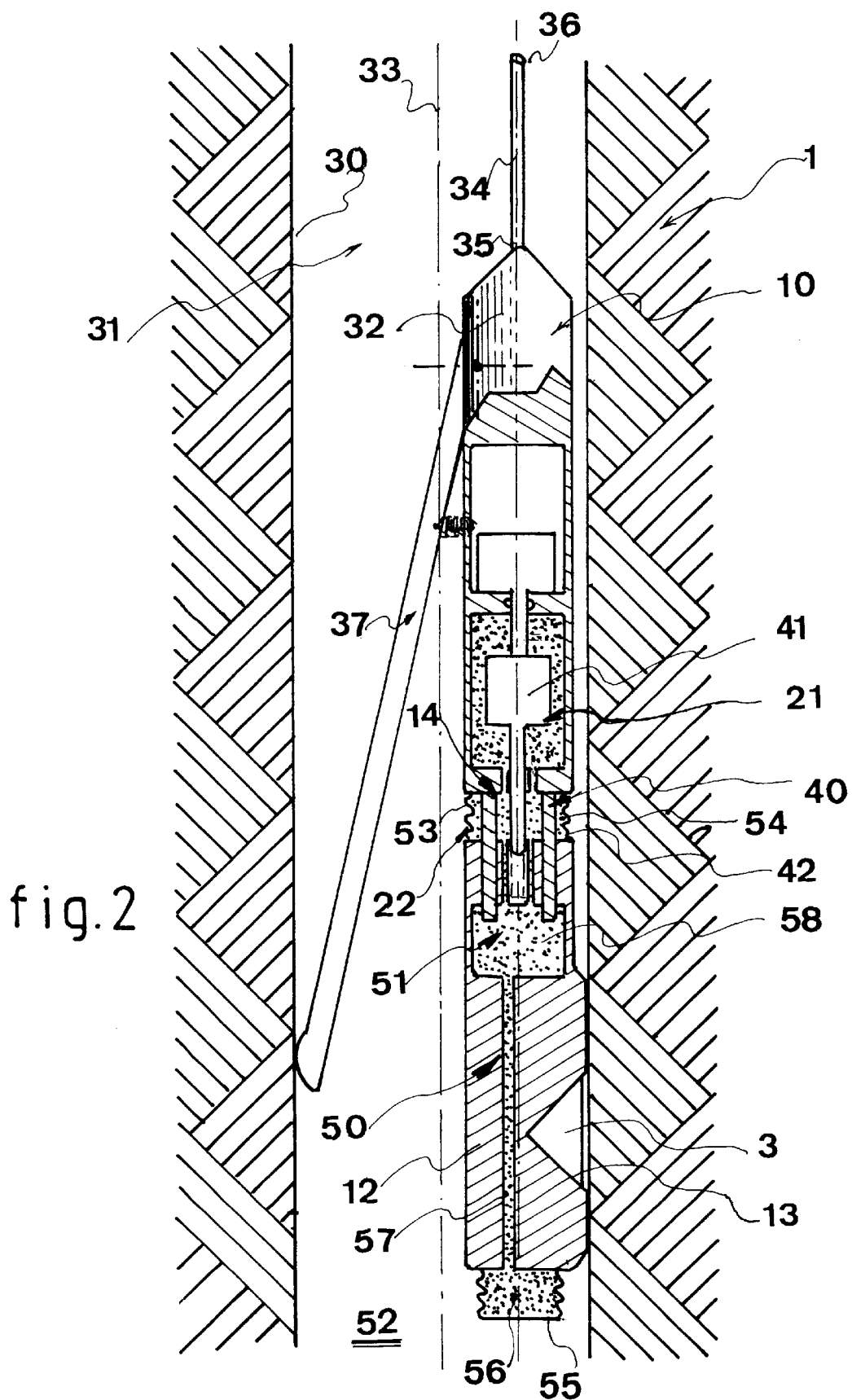

With regard to the means 14 for coupling together the drive head 10 and the skid 12, as shown in FIG. 2 they advantageously include first means 21 for causing the skid 12 to move relative to the drive head 10 in a first sense and during a first period as a function of the values D, L, and T so that during said first period, the skid 12 remains stationary relative to the surface 2 of the ground 1 while the drive head 10 is being displaced in continuous translation relative to the surface 2, and second means 22 for causing the skid to move relative to the drive head in a second sense opposite to the first sense and during a second period of duration shorter than the first period.

In preferred manner, the first period is substantially equal to L/V, the drive head 10 moving during said first period over a distance that is substantially equal to the value D, and the second period has a value that is as small as possible.

For example, the first means 21 for causing the skid 12 to move relative to the drive head 10 in the first sense, during the first period as a function of the values D, L, and T so that during said first period, the skid 12 remains stationary relative to the surface 2 of the ground 1 while the drive head 10 is being displaced in continuous translation relative to said surface 2, can be constituted by controllable means for locking the skid 12 relative to the surface 2 of the ground during at least a determined duration T as defined above, while the head 10 continues to be driven, the skid being mounted to slide freely over a slideway connected to the drive head, for example. The controllable means can, for example, be constituted by a hook that is suitable for being anchored by penetrating into the ground, and that is situated at the end of an arm, such as the arm of the means 37 which are described below.

With regard to the second means 22 for causing the skid 12 to move relative to the drive head 10 in the second sense opposite to the first, during the second period of duration shorter than the first period, they are constituted by means for unlocking the skid relative to the surface 2 of the ground, i.e. means which, for example, enable the arm including the hook to be returned to its original position, e.g. pressed against the skid 12, and means, e.g. a spring or the like that becomes loaded when the skid is locked relative to the ground while the drive head 10 is being displaced, for returning the skid 12 to the drive head 10 in a very short time, much shorter than T.

Such a solution is particularly advantageous in the case of a well, in particular an oil well, where the surface 2 in question is constituted by the wall 30 of the well 31.

The tool shown diagrammatically in FIG. 1 operates as follows:

With reference to FIG. 1, it is firstly assumed that the drive head 10 is displaced in the sense shown by arrow 15 and that the skid 12 is behind the drive head, as close as possible to the head and facing a first point 16 on the surface 2 of the ground.

The drive head 10 is driven to move in continuous translation over the surface 2 of the ground 1 at a speed V. The first means 21 cause the skid 12 to move relative to the head 10 so that it remains stationary facing the first point 16. This is performed during the first period that is substantially equal to T. The sonde is caused to carry out measurement only while the skid is stationary relative to the ground, thereby enabling the sonde to perform reliable analysis of the rocky medium contained in its lobe.

At the end of the first period, the second means 22 cause the skid to move in translation relative to the head in order to make it snap instantaneously over the distance D and return to its original position relative to the head. The skid is then situated facing a second point 17 of the surface, which point is distant from the first point 16 by the distance D and therefore by the width L.

The first means 21 once again cause the skid 12 to move relative to the head 10 so that it remains stationary facing the second point 17 for a period of time equal to the first period so as to enable the sonde to carry out a reliable measurement in the lobe 4 shown by a dashed line in FIG. 1, adjacent to the previous lobe shown by a solid line.

The second means 22 are caused to operate in turn, and so on, in order to carry out successive measurements over a long distance along the surface 2.

In the example given above, the skid 12 is situated behind the drive head 10. But, naturally, it could be situated in front of the drive head. In which case, the tool would have the same configuration as that shown in FIG. 1, but the drive head 10 would be displaced in the sense shown by arrow 18. In its original position relative to the drive head, the skid would then be as far away as possible from the head. During the first period, the skid and the drive head would move towards each other, and during the second period they would move apart from each other.

The tool described above finds a particularly advantageous application in analyzing oil-bearing rocks surrounding the wall 30 of an oil well 31. An embodiment of the tool for this application is shown in FIG. 2. For the purpose of simplification, the same references used in FIGS. 1 and 2 designate the same elements. Only the surface over which the tool is displaced and referenced 2 in FIG. 1, is referred to as the "well wall" and is referenced 30 in FIG. 2.

In the embodiment in FIG. 2, the tool presents the same general structure as that described above with regard to FIG. 1. However, in this embodiment the drive head 10 is constituted by a shoe 32 suitable for being mounted to slide freely in the well 31 parallel to the axis 33 of the well, a traction cable 34 having one end 35 that is secured to the shoe 32 and having another end 36 that is suitable for being connected to a drive member that drives it at a constant speed of value V, e.g. a drive shaft, and means 37 tending to press the shoe 32 against the wall 30 of the well 31. The means 37 can be of any type. As shown, they can be constituted by a rotary arm that is mounted at one of its ends to the shoe 32, and by a spring which tends to cause the arm to pivot so that its other end presses against the portion of wall of the well that is opposite the portion of wall against which the shoe, and consequently the skid 12, are to be pressed.

In this embodiment, the means 14 for coupling together the drive head 10 and the skid 12 so that the two elements can be displaced relative to each other along the direction 11 over a distance of value equal to D, include shaft means 40 mounted in co-operation with the shoe 32 and the skid 12 so that the shoe and the skid slide relative to each other along said shaft means. As shown in FIG. 2, the shaft means 40 are advantageously constituted by two cylindrical rods secured to the shoe 32 and slidably mounted in two complementary orifices formed in the skid 12. The skid can therefore be displaced relative to the shoe without being subjected to interfering rotations relative to said shoe.

The means 14 further include first drive means 41 for causing the skid 12 and the shoe 32 to move relative to each other at a determined first speed in translation in a first sense along the shaft means. In this embodiment, when the shoe is disposed in front of the skid, the first drive means 41 are advantageously constituted by a motor having an outlet shaft that is coupled to the skid via a free-wheel gear, the motor being caused to rotate at a speed such that the relative speed at which the skid moves away from the shoe is equal to the speed at which the shoe is driven in translation by the traction cable 34. Furthermore, the free-wheel gear is made so that once the skid and the shoe have moved apart from each other by the distance D, the free wheel is disengaged.

The means 14 finally include second drive means 42 for causing the skid 12 to move in translation relative to the shoe 32 in the second sense opposite to the first, along the shaft means 40 and at the second speed which is greater than said first speed. In this case, the second drive means 42 can be constituted by a traction spring, for example, which moves the skid towards the shoe almost instantaneously, as soon as the free wheel has disengaged as mentioned above.

It is known that an oil well essentially contains drilling fluids having hydrostatic pressure that is relatively high and that increases progressively towards the bottom of the well. Also, in order to ensure that the skid 12 is, in the terminology of the art, at pressure equilibrium with the environment 52 in which the tool is situated, the tool includes means 50 for maintaining at least the inner portion 51 of the skid 12, in which the shaft means 40 are displaced, at pressure equilibrium with the pressure that exists in the well 31.

The means 50 are constituted by at least a first sealed case 53 having a flexible wall connecting the skid and the shoe in order to form a first sealed volume 54 surrounding the shaft means 40, a second sealed case 55 having a flexible wall in order to form a second sealed volume 56, a through hole 57 made in the skid 12 in order to put the first and second sealed volumes 54, 56 and the inner portion 51 of the skid 12 in which the shaft means 40 are displaced into fluid communication with one another, and an incompressible fluid 58 filling the first and second sealed volumes, the inner portion of the skid in which the shaft means are displaced, and the through hole 57.

In an advantageous embodiment, the first and second flexible-walled sealed cases 53 and 55 are constituted by bellows, and the incompressible fluid 58 is constituted by an oily liquid.

In this embodiment, when the second drive means 42 are constituted by a traction spring, the traction spring is constituted by the bellows defining the first sealed case 53.

The operation of the tool described above and as shown in FIG. 2 is identical overall to the operation described above for the tool in FIG. 1. However, FIG. 3 is a diagram comprising four views referenced $3A_1$ to $3A_4$ of the tool in FIG. 2, showing specific features of its operation.

FIG. 3A1 shows a first stage during which the skid 12 remains stationary relative to the wall 30 of the well 31 at a first point on said wall, while the shoe 32 is being driven in translation by the cable 34, and the sonde 3 is carrying out a first measurement. During this stage, the first volume 54 increases, this increase being compensated by a reduction in the second sealed volume 56.

FIG. 3A2 shows a second stage, subsequent to the first, during which the skid 12 moves upwards, almost instantaneously, into contact with the shoe 32 over a distance D. During this second stage, the first sealed volume 54 reduces, this reduction being compensated by an increase in the second sealed volume 56.

Figure 3:
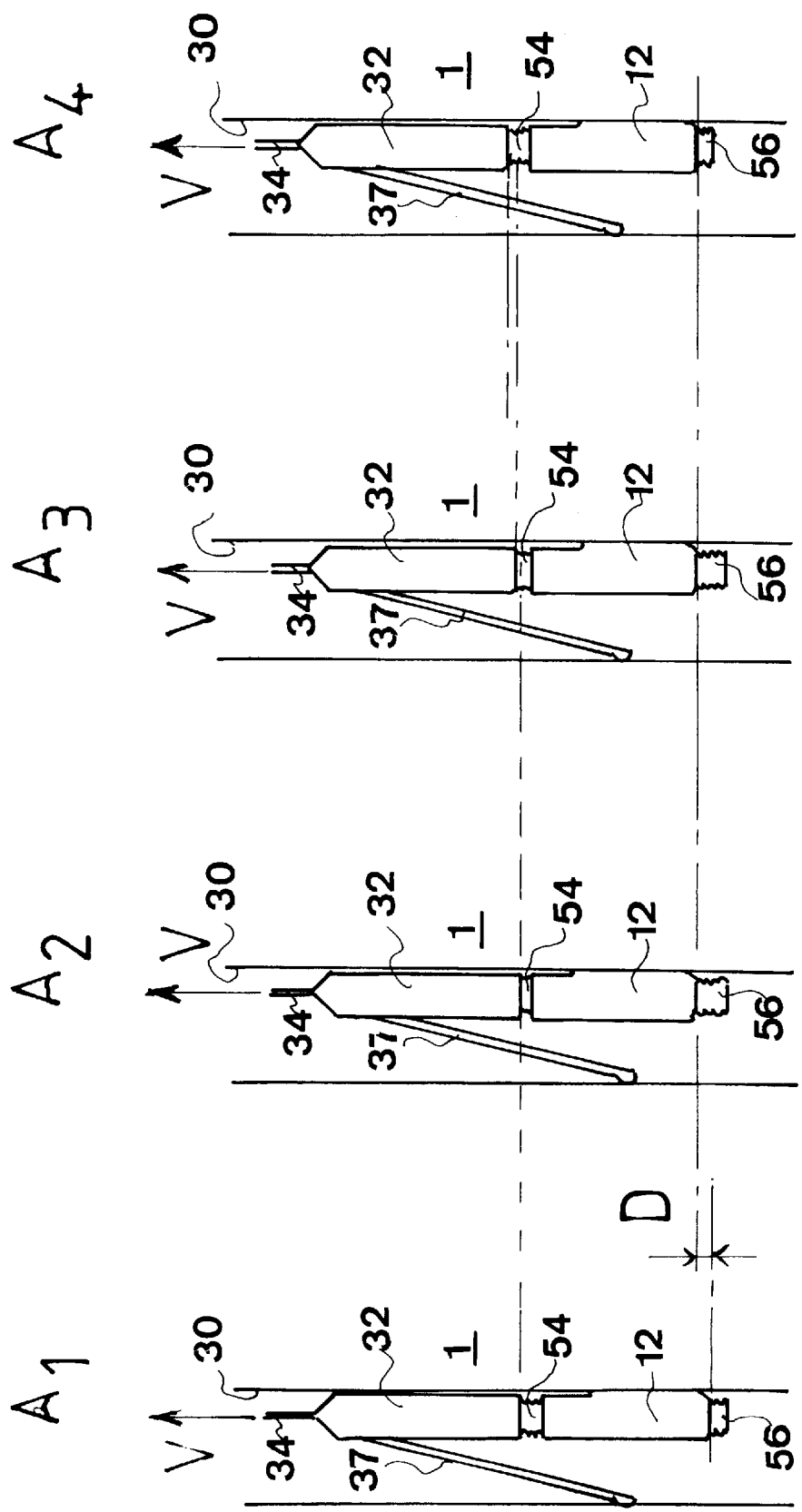
FIG. 3 shows four views referenced $3A_1$ to $3A_4$ for explaining the operation of the FIG. 2 tool of the invention.

FIG. 3A3 shows a third stage, subsequent to the second, during which the skid 12 once again remains stationary relative to the wall of the well, but at a second point offset by distance D from the first point, the shoe still being driven in continuous translation by the cable 34, the sonde carrying out a second measurement during this third stage. The sealed volume 54 increases once again, this increase being compensated by the reduction in the second sealed volume 56.

FIG. 3A4 shows the configuration of the tool at the end of the third stage, when the second measurement has been completed. The tool is then ready to be subjected to a stage identical to the second stage described above, and so on, for as long as the shoe is moved in translation along the side wall of the well.

Throughout its displacement, the shoe, and consequently the skid, is maintained substantially pressed against the wall of the well by means of the arm 37 which slides over the wall providing a reaction force.

It should be observed that sondes and means for transmitting the signals generated by sondes to the surface of the well are well known in themselves. The person skilled in the art is entirely familiar with them, and they are therefore not described further.

What is claimed is:

1. An analysis tool for analyzing the ground (1), from a surface (2) thereof, by means of a rock analysis sonde (3) having a determined analysis lobe (4) and a resolution time equal to T, the tool comprising:

a drive head (10);

means for driving said drive head to move in continuous translation at a speed V relative to said surface (2) of the ground (1) and along a given direction (11) parallel to said surface (2);

a skid (12);

means (13) for associating the sonde (3) and the skid (12); and means (14) for displacing the drive head (10) relative to the skid (12) along said direction (11) over a distance having a value equal to D;

the tool being characterized by the fact that the value D is a function of the width L of the lobe defined along said direction, of the speed V, and of the resolution time T, the values D, L, V, and T being linked by the following relationships $D \geq L$ and $D \geq VT$.

2. A tool according to claim 1, characterized by the fact that the means (14) for displacing the drive head (10) relative to the skid (12) include first means (21) for causing the skid (12) to move relative to the drive head (10) in a first sense along said given direction during a first period, and second means (22) for causing the skid (12) to move relative to the drive head (10) in a second sense opposite to the first sense during a second period subsequent to the first period, said second period having a duration shorter than the first period.

3. A tool according to claim 2, characterized by the fact that the first period is substantially equal to L/V.

4. A tool according to claim 2, characterized by the fact that the first means (21) for causing the skid (12) to move relative to the drive head (10) in the first sense during the first period are constituted by controllable means for locking the skid (12) relative to the surface (2) of the ground (1) during at least the determined duration T, and that the second means (22) for causing the skid (12) to move relative to the drive head (10) in the second sense opposite to the first during the second period are constituted by means for unlocking the skid relative to the ground (2) of the ground (1), and means for returning the skid (12) to the drive head (10) in a time shorter than T.

5. A tool according to claim 1, characterized by the fact that said drive head (10) is constituted by:

a well shoe (32);

means for slidably mounting said well shoe in a well (31) parallel to the axis (33) of said well;

a traction cable (34) having one end (35) that is secured to said shoe (32) and having another end (36) that is suitable for being connected to a drive member that drives it at a constant speed of value V; and means (37) for pressing said shoe (32) against the wall (30) of said well (31).

6. A tool according to claim 5, characterized by the fact that the means (14) for displacing the drive head (10) relative to the skid (12) along said direction (11) over a distance of value equal to D, include:

shaft means (40) mounted in co-operation with the shoe (32) and the skid (12) so that the shoe and the skid slide relative to each other along said shaft means;

first drive means (41) for causing the skid (12) and the shoe (32) to move relative to each other at a determined first speed in translation in a first sense along the shaft means; and second drive means (42) for causing the skid (12) to move in translation relative to the shoe (32) in a second sense opposite to the first, along the shaft means (40) and at a second speed that is greater than said first speed.

7. A tool according to claim 6, characterized by the fact that it includes means (50) for maintaining at least the inner portion (51) of the skid (12), in which the shaft means (40) are displaced, at pressure equilibrium with the pressure of the medium that exists in said well (31).

8. A tool according to claim 7, characterized by the fact that the means (50) for maintaining at least the inner portion (51) of the skid (12), in which the shaft means (40) are displaced, at pressure equilibrium with the pressure of the medium (52) that exists in said well (31), are constituted by at least:

a first sealed case (53) having a flexible wall connecting said skid and said shoe in order to form a first sealed volume (54) surrounding said shaft means (40);

a second sealed case (55) having a flexible wall in order to form a second sealed volume (56);

a through hole (57) made in said skid (12) in order to put the first and second sealed volumes (54, 56) and the inner portion (51) of the skid (12) in which the shaft means (40) are displaced into fluid communication with one another; and an incompressible fluid (58) filling the first and second sealed volumes (54, 56), the inner portion (51) of the skid (12) in which the shaft means (40) are displaced, and the through hole (57).

9. A tool according to claim 8, characterized by the fact that both the first and second flexible-walled sealed cases (53 and 55) are constituted by bellows, and that the incompressible fluid (58) is constituted by an oily liquid.

* * * * *